J. E. BOEGEN.
STEAM, AIR, AND WATER TRAP VALVE.
APPLICATION FILED JUNE 1, 1908.

986,797.

Patented Mar. 14, 1911.
3 SHEETS—SHEET 1.

UNITED STATES PATENT OFFICE.

JOHN E. BOEGEN, OF BERWYN, ILLINOIS, ASSIGNOR TO CHARLES P. MONASH, OF CHICAGO, ILLINOIS.

STEAM, AIR, AND WATER TRAP-VALVE.

986,797.

Specification of Letters Patent. Patented Mar. 14, 1911.

Application filed June 1, 1908. Serial No. 436,057.

*To all whom it may concern:*

Be it known that I, JOHN E. BOEGEN, a citizen of the United States, residing at Berwyn, in the county of Cook and State of Illinois, have invented a certain new and useful Improvement in Steam, Air, and Water Trap-Valves, of which the following is a specification.

This invention relates to trap valves for automatically discharging water of condensation or other liquid or medium, such as steam or air, without attention from an operator, when once adjusted for use; and is particularly adapted for use with steam heating systems, by attachment to a radiator or heating coil, but can be used generally where it is desired to trap and discharge liquids and mediums of various kinds.
The objects of the invention are—to construct a trap valve embodying a casing having a chamber with a float located in the chamber and adapted to be elevated with the rise of the water of condensation in the chamber, the casing having in its side and bottom wall a downwardly and inwardly extending conduit, the lower end of which communicates with an outlet passage in the bottom of the casing, the mouth or upper end of the side conduit opening into the chamber with its lower side approximately in line with the midway length of a float in the chamber, when the float is at rest or in normal position; to construct a casing having an open top closed by a cap, so as to furnish a chamber, the casing having an inlet passage leading into the chamber, and having in its side and bottom wall a side conduit leading from the chamber, the casing also having in the bottom a discharge or outlet passage with which the lower or discharge end of the side conduit or passage communicates, the chamber having located and operating therein a float, the lower end of the float carrying a stem controlling the discharge between the side conduit or passage from the chamber and the bottom discharge or outlet passage; to construct a trap valve consisting of a casing inclosing a chamber with an inlet passage into the chamber and a side conduit or passage leading from the chamber, the side conduit or passage opening, at the lowermost side of its receiving end or mouth, approximately in line with the midway length of the chamber for first educting oil and floatage on the top of the water of condensation in the chamber, thereby maintaining the trap valve clear of accumulated oil and floatage deposited in the chamber; to furnish an outlet from the float chamber of a trap valve said outlet consisting in part of a side conduit, with a receiving end or mouth opening into the chamber at a point to discharge oil and floatage and to allow air to vent from the trap valve, as the chamber fills with the water of condensation; and to improve, generally, the construction and arrangement and operation of the elements entering into the formation of the trap valve as a whole.

The invention consists in the features of construction and combination of parts hereinafter described and pointed out in the claims as new.

In the drawings, Fig. 2 a similar view to Fig. 1, showing a modification of the inlet passage and by-pass and its valve; Fig. 2ᵃ is a perspective view of the plug in the bottom wall of the casing.

Figure 1:
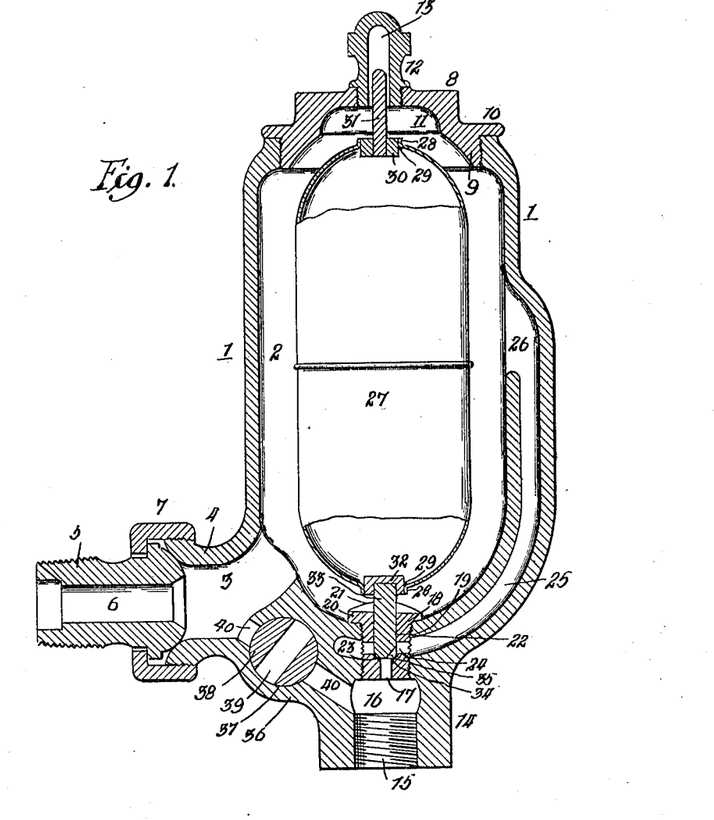
Figure 1 is a sectional elevation of the trap valve of the present invention, with the float partly in full elevation.

The trap valve of the present invention has a shell or casing 1 inclosing a chamber 2 and open at the top and closed at the bottom, except as to having a discharge or outlet passage for the water of condensation, formed in the chamber 2 of the casing, or for discharge of other liquid or medium from the chamber. An inlet passage 3, formed in a neck 4 of the shell or casing, opens into the chamber 2 adjacent the bottom of the chamber, as shown in Fig. 1; and connected with the neck 4 is a union nipple 5, having a passage 6 which opens into the passage 3, and the union nipple is connected to the neck by a nipple nut 7, as usual.

The open upper end of the shell or casing 1 is closed by a cap 8, having a depending rim or flange 9 with an exterior screw thread by which the cap is threaded into the end of the shell or casing; and when in place a flange 10 on the cap abuts against the end face of the shell or casing so as to make a tight joint between the cap and the shell or casing. The cap 8, on its under side, as shown, is formed with a chamber or cavity 11 to permit of the operation of the float. A plug 12 is threaded into the cap 8 at the center, and this plug has a guide hole 13 which receives a guide pin or stem on the upper end of the float to maintain the float in a straight line of movement.

The lower end of the shell or casing 1 has formed therewith a neck or boss 14, having a threaded hole 15 for the attachment of a discharge or vacuum pipe in the use of the trap valve. The threaded hole 15 opens into a chamber 16, and a port 17 opens into the chamber 16, which port 17, in the construction shown, is formed in a plug 18, threaded into a hole 19 formed in the bottom wall of the shell or casing 1, as shown in Fig. 1. The plug 18, as shown, has a flange or rim 20 with a cross-slot 21 for inserting the plug with a screw-driver or other tool, but the flange 20 with its cross-slot is not a necessity and can be omitted, leaving the top of the plug 18 flush or nearly so with the inner face of the bottom wall of the shell or casing. The plug 18 has a central longitudinal passage or hole 22 extending to the port 17 and terminating in a seating face 23 around the port; and leading into the passage or hole 22 is a cross passage 24 forming, with the lower end of the passage or hole 22 and the port 17, a discharge or outlet passage for the water of condensation or other liquid or medium. The lateral or cross passage 24, at one end, is in communication with a side conduit or passage 25, formed in the side and bottom wall of the shell or casing 1 and having, at its upper end, a mouth 26 opening into the chamber 2 of the shell or casing, with the lowermost side of the mouth 26 in line, or approximately so, with the midway length of the chamber and is located in such relation to the filling of the chamber with the water of condensation or other liquid that any oil or floatage on top of the water of condensation will flow into the side conduit passage, before the line of flotation for the float is reached and the float elevated, so as to open the bottom discharge or outlet passage leading into the discharge chamber 16, thereby removing the oil and floatage from the chamber 2, prior to the flow and free discharge of the water of condensation or other liquid or medium in the chamber 2, thus maintaining the chamber 2 clear of oil and any floatage that might accumulate in the chamber and interfere with the operation of the float in the chamber.

The float 27, in the form shown, is made of two halves or sections of thin metal, joined at the center by overlapping beads, so as to be practically air tight. Each end of the float has an outwardly turned rim 28 encircling a hole or opening 29, and the opening 29, for the upper end of the float, has secured therein a plug or reinforcement 30, in which is secured a guide pin 31, projecting into the guide hole 13 of the plug 12, for guiding and maintaining the top of the float in operative position. The opening 29, at the lower end of the float, has entered thereinto and secured therein a plug or reinforcement 32, so that when the plugs or reinforcements 30 and 32 are in place the float is practically air tight so as to rise and fall with the liquid or medium in the chamber 2, as the liquid or medium rises and falls in the chamber.

The plug or reinforcement 32 has secured therein a stem 33, the lower end of which is formed so as to present a seating face 34 to co-act with the seating face 23 around the port 17, and, for practical purposes, the contact of the seating faces 34 and 23 should be slight, but sufficient to close communication between the lateral passage or hole 24 and the port 17, which will allow the float to rise readily and without interference from adhesion between the seating faces, and at the same time the end face of the stem 33, presented in line with the port 17, will not be sufficient to interfere with the upward movement of the float to any material extent, when the trap valve is used in connection with a vacuum system of heating or for other purposes where a vacuum is employed for discharging purposes. The stem 33 has an end slot or nick 35 for venting air from the upper portion of the float chamber in the ordinary operation of the trap valve. The slot or nick 35 is in open communication with the side conduit or passage 25, and is of sufficient depth to prevent a sealing action from the water of condensation that would interfere with the venting of the air under ordinary conditions. The air enters the upper portion of the float chamber above the water of condensation and is free to flow into the side conduit or passage 25 and pass through the slot or nick 35 and enter the chamber 16 to be discharged into the atmosphere or elsewhere as desired, and this whether a vacuum is present to draw off the air, or the air is forced out by the rise of the water of condensation in the float chamber. The terminal end of the side conduit or passage is curved, and the curvature is one that permits of the escape of the water of condensation, with the rise of the float, without fully closing the cross passage 24 and slot or nick 35 against the escape of air as the float rises and falls.

A wall 36 of the shell or casing 1 connects the neck 4 and the neck or boss 14, and this wall 36 has therein a cross chamber or hole 37, which receives a valve plug 38, adapted to be hand operated. The valve plug 38 has a cross passage 39, which can be brought into communication with or shut off from communication with a by-pass 40, connecting the inlet passage 3 and the discharge chamber 16, so that, in starting the trap, direct communication can be established between the inlet passage 3 and the discharge passage or chamber 16 to discharge any accumulated water of condensation in the radiator or coil direct, and also to furnish communication direct between the two passages for blowing out purposes.

Figures 2, 2A:
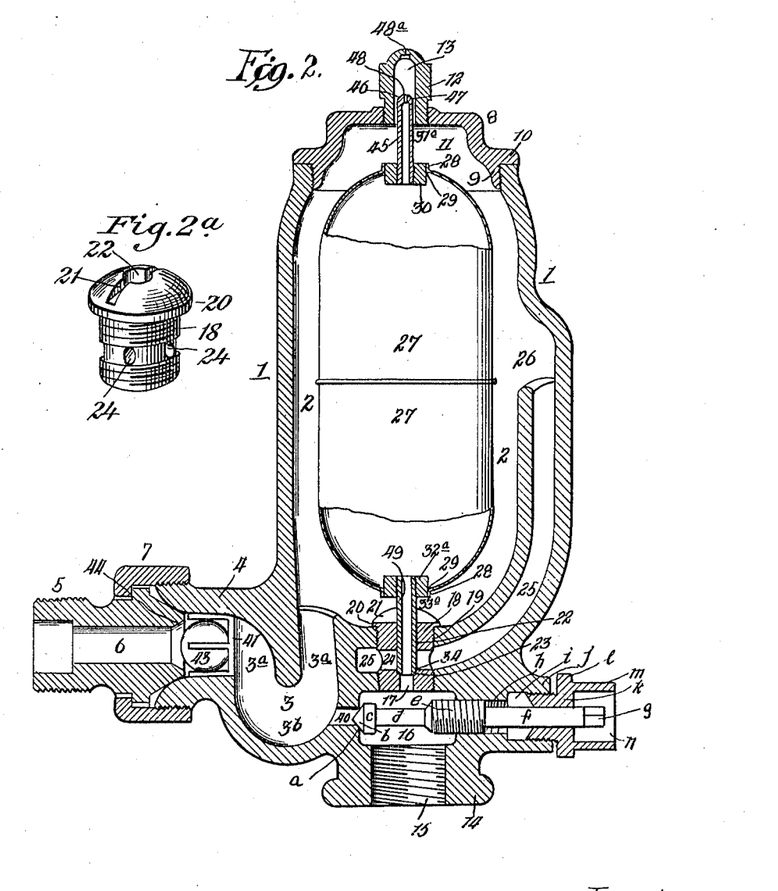
Figure 3:
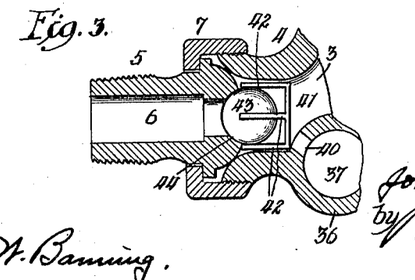
Fig. 3 a detail in section, showing a check valve controlling the inlet passage into the float chamber of the trap valve.

The construction, shown in Fig. 1, has a free inlet passage 3 leading into the chamber 2 of the float. As shown in Fig. 2, the inlet passage 3 is controlled by a check valve, so that, in case of back pressure or failure of the vacuum to work, the flow of water of condensation from the radiator or coil or other sources of supply will be shut off.

The construction of Fig. 2 has entered into the mouth of the inlet passage 3 a basket 41, having lateral arms 42 with openings between the arms; and in the chamber, formed by the basket 41 and held in place by the arms or fingers 42, is a ball valve 43, and a seat 44 for the ball valve 43 is formed in the end of the union nipple 5, around the end of the passage 6 in said nipple. It will be understood that, when the vacuum is operating correctly, the ball valve will be forced away from the seat 44 so as to furnish open communication into the inlet passage 3 for the water of condensation to flow into and rise in the chamber 2 for the float, but, in the event of back pressure or failure of the vacuum to operate, the ball valve 43 will be forced against its seat 44, closing communication into the passage 3 and shutting off the flow of water of condensation into the chamber 2 of the float.

The float, shown in Fig. 1, has, at the upper end, a solid guide pin 31, and, at the lower end, a solid shut off or controlling stem 33, but the float can be provided with other forms of guide pins and controlling or shut off stems than those shown in Fig. 1. Other forms of construction for the float are shown in Figs. 4, 5, 6, and 7.

Figure 4:
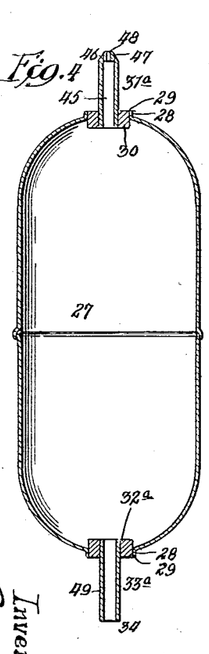
Figs. 4, 5, 6 and 7 are sectional elevations, each showing a form of float adapted for use with the trap valve, the several floats having modified forms of construction.

The construction, shown in Figs. 2 and 4 has entered into the plug or reinforcement 30 a tube 45 having a seating end 46, and the upper end of the tube is closed by a plug 47 having a port 48, so that the tube 47 furnishes a guide stem 31ª projecting into the guide passage or hole 13 of the plug 12 for guiding and directing the upper end of the float. The port 48 permits air, forced from the chamber 2 by the admission of water of condensation, to pass into the interior of the float for discharge, and, in order to allow the air to discharge, the lower end of the float is closed by a plug or reinforcement 32ª into which is entered and secured a tube 49, which tube serves as a shut off or controlling stem 33ª, its lower end having a seating face, corresponding to the seating face of the stem 33 in the construction shown in Fig. 1, to co-act with the seating face 23 around the discharge port. The top of the guide hole or passage 13 is to be formed with a seating face to co-act with the seating face 46 of the guide pin 31ª, so that, with the full rise of the float, the passage of air through the port 48 will be shut off.

Figure 5:
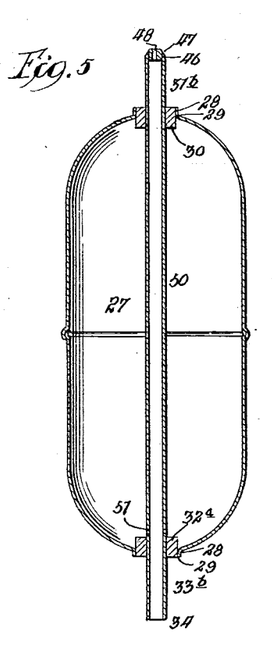

The construction, shown in Fig. 5, has a continuous tube extending through the float and projecting, at each end, beyond the respective plugs or reinforcements 30 and 32ª, the projecting upper end of the tube 50 forming a guide pin 31ᵇ to enter the guide hole 13, the same as and for the same purpose as described for the guide pin 31 in the construction of Fig. 1. This continuous tube 50, at its upper end, has a seating face 46 closed by a plug 47, with a port 48 corresponding to the same parts and for the same purpose as described for the construction of Fig. 4. The projecting lower end of the continuous tube 50 forms a shut off or controlling stem 33ᵇ, corresponding to and for the same purpose as the shut off or controlling stem 33 in the construction of Fig. 1. The air, with the construction of Fig. 5, is forced from the chamber 2 through the port 48 and discharges at the lower end of the continuous tube, and such discharge will continue until the float rises for the seating face 46 to co-act with the seating face in the plug 12 to shut off communication between the chamber 2 and the port 48, stopping the outflow of air from the chamber. The tube 50, at a point just above or in line with the upper face of the plug or reinforcement 32ª, has its wall provided with holes or perforations 51 for the purpose of allowing any water of condensation formed within the interior of the float to escape, thus maintaining the interior of the float free from any accumulation of water of condensation.

Figure 6:
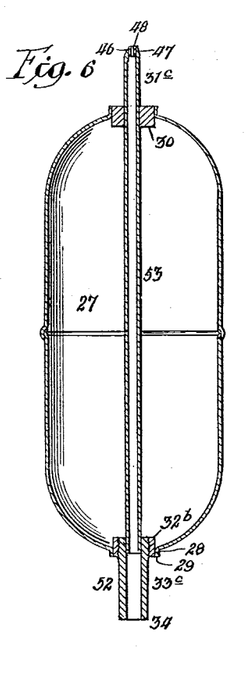

The construction, shown in Fig. 6, has the lower end of the float closed by a plug or reinforcement 32ᵇ with an interior screw thread, into which is threaded the upper end of a tube 52, which tube constitutes a shut off or controlling stem 33ᶜ, corresponding to and for the same purpose as the shut off or controlling stem 33 in the construction of Fig. 1, except that the tube furnished a discharge for air. The tube 52 has loosely entered thereinto the lower end of a tube 53, extending through the float from end to end, with the upper end of the tube 53 projecting beyond the plug or reinforcement 30 and forming a guide pin or stem 31ᶜ, and the upper end of the tube 53 has a seating face 46, closed by a plug 47 with a port 48, corresponding to and for the same purpose as the same parts described for the construction of Fig. 4. The continuous tube 53 is free to slide within the tube 52, and thereby compensate for expansion and contraction of the body of the float in use without breaking the connection between the tubes 52 and 53 and destroying the free passage of air through the tube 53 to discharge through the tube 52; and the air will continue to discharge until the float has risen to a point where the seating face 46 co-acts with the seating face in the plug 12 to shut off the flow of air from the chamber 2, with the rise of the float in the chamber. The loose connection of the lower end of the tube 53 with the tube 52 will allow any water of condensation accumulating in the float to pass away, thus maintaining the interior of the float free from the accumulation of the water of condensation. The water of condensation, as it rises in the chamber 2 around the exterior of the float, will force the air from the chamber, as described for the construction of Fig. 4.

Figure 7:
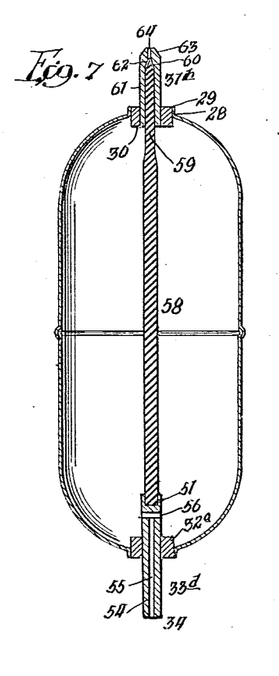

The construction shown in Fig. 7 has entered into the plug or reinforcement $32^a$, and projecting on each side of the plug or reinforcement, a stem 54 having a passage 55, which stem 54 constitutes a shut off or controlling stem $33^d$, corresponding to and for the same purpose as the shut off or controlling stem 33 in the construction of Fig. 1. The projecting upper end of the stem 54 has a cross passage 56, in communication with the passage 55, for discharging air admitted into the interior of the float, as hereinafter described; and the upper end of the stem 54 has a socket 57 into which is entered and secured the lower end of a stem 58 of expansible material. The upper end 59 of the expansible stem 58, as shown, is reduced in cross diameter and terminates in a point having a seating face 60, so that the expansible member or stem 58 acts as a shut off for the inflow of air into the interior of the float. The upper end 59 of the expansible member or stem 58 is loosely entered into a tube or stem 61 upwardly extending from the plug or reinforcement 30, and forming a guide pin or stem $31^d$, corresponding to and for the same purpose as the guide pin 31 in the construction of Fig. 1, as to guiding and positioning the upper end of the float. The tube or stem 61, at its upper end, has an interior seating face 62, which co-acts with the seating face 60 around the point of the upper end 59 of the expansible member or stem, and the upper end of the stem or tube 61 has a seating face 63 with a port or passage 64, for the same purpose as the seating face 46 and the port 48 described for the construction shown in Fig. 4. The air, forced from the chamber 2 by the rise of the water of condensation in the chamber, will flow through the port 64 and discharge around the reduced end 59 of the expansible member or stem 58 into the interior of the float and will pass through the lateral opening 56 into the passage 55 for discharge at the lower end of the tube 54.

The air, with the construction and arrangement of float shown in Fig. 1, is forced out through the mouth or opening 26 into the passage 25 with the rise of the water of condensation in the chamber 2 for the float, and the air thus forced out discharges through the slot or nick 35 in the seating end of the shut off or controlling stem 33, thus insuring the outflow of the air from the chamber of the float, as the water of condensation rises in the chamber.

The air, in the construction of float shown in Figs. 4, 5, 6, and 7, instead of discharging through the mouth or opening 26 of the side conduit or passage 25, will discharge through the port 48 of the guide stems $31^a$, $31^b$, and $31^c$, of the respective floats shown in Figs. 4, 5, and 6, and through the port 64 of the guide pin $31^d$ in the construction of Fig. 7, the air thus discharging with the various floats, as the water of condensation rises in the chamber of the float, so long as the air port of the various forms of float is open to permit the outflow of air from the float chamber, but with the air port of the several floats closed by the upper movement of the float the outflow of air will be prevented. The outflow of air, with the construction of Fig. 1, is shut off when the water of condensation enters the passage 25, so as to form a water seal around the lateral port or passage 24, closing the slot or nick 35 against the outflow of air.

The main and essential feature of the trap valve of the present invention is, providing a side conduit or passage by which oil and floatage on top of the water of condensation will be carried off so as not to accumulate in the chamber of the float, and at the same time have provision made by which the air will be removed, as the water of condensation rises in the chamber of the float, and to this end the several forms of floats, which are illustrated and described, can be utilized as the float for operation in the chamber of the trap valve.

The operation of the trap valve will be understood from the foregoing description, but briefly is as follows: The air and water of condensation from a radiator or heating coil will flow into the bottom of the float chamber through the inlet passage 3 and will gradually fill the chamber around the float. The air will be forced from the chamber, as the water of condensation rises therein, and the outflow of air will continue until the air port, furnished by the slot or nick 35 is water sealed, or the air port 48 or 64 is closed by the seating face for the port. The outflow of air will continue until the accumulated water of condensation has reached a point where it can flow out from the chamber 2 around the float, through the opening or mouth 26 into the side conduit or passage 25; and, with the initial outflow into the side conduit or passage 25, and before the line of flotation for the float has been reached by the water of condensation, any oil or floatage on the top of the water of condensation will first flow off into the passage 25, through the mouth or opening 26, thus removing any accumulated oil or floatage from the chamber and preventing any filling up of the chamber that would interfere with the free operation or movement of the float in the chamber from the oil or floatage accumulating in the chamber. As the water of condensation rises to the line of floatation for the float and reaches a point where it can outflow into the side conduit or passage 25, the float will rise so as to open the cross passage 24, opening the port 17 so that the water of condensation discharged into the side conduit or passage 25 will flow into the discharge chamber or passage 16 through the port 17, and be returned through the connecting pipe, not shown, into a header or other receptacle, as usual, in carrying off the water of condensation from a vacuum or other heating system.

It will be seen that the trap valve of the present invention assures the removal of any oil or floatage from the chamber of the float, and at the same time provides for a free escape of the air, so as to prevent the radiator coil from becoming air bound. While the trap valve is especially adapted for use with a vacuum system of heating, it is intended for and can be used with other systems of steam heating, and can also be used for automatically discharging air and water from any steam heating or distributing device, and can be used as a grease extractor and separator for compressed air tanks, drips and drains, and for other appliances, where it is desirable and necessary to have an effective and reliable device for removing oil and floatage that would interfere with the operation of a float or other mechanism.

It will be understood that with the construction of float shown in Fig. 7, as the expansible member or stem is lengthened from the action of the water of condensation or the heat of the steam, such lengthening will cause its upper end to seat and close the port 64 against the admission or inflow of air, and such lengthening of the expansible member or steam can occur prior to the elevation of the float by the rise of the water of condensation in the chamber 2 of the float; or the expansible member or stem can be so adjusted as to be affected by the heat with the elevation of the float.

The passage 3, in the construction of Fig. 1, opens into the float chamber 2 in an upward direction, so as to deflect the inflow of the water of condensation into the chamber in a direction to prevent the water from striking directly against the lower end of the float; and it will be seen that, when the water of condensation has entered the inlet 3 and the float chamber 2 at a point above the upper plane of the inlet passage, a seal is formed which will prevent air and steam from escaping from the radiator or coil. The construction shown in Fig. 2 has the inlet passage 3 of a U shape formation, with two legs 3ª and a curved lower portion 3ᵇ the curved lower portion furnishing a settling chamber for the heavy sediment, so as to hold such sediment from passing into the float chamber. The U passage, with its legs 3ª, forms, in effect, a goose neck trap, which, when the water of condensation rises thereinto so as to flow into the chamber 2 for the float, will furnish a seal against the eduction or outflow of air and steam from the radiator or coil.

The construction shown in Fig. 2, instead of having a cut-out valve crosswise of the by-pass, as in the construction of Fig. 1, has the by-pass 40, with a seating face a, around its inner end, with which a seating face b on a valve head c coacts. The valve head c is carried by a section d of an adjusting stem, which stem, in the arrangement shown, has an enlarged section e with an exterior screw head, extending outwardly from which is a section f terminating in an end g for the reception of a wrench or key, by means of which the valve head c can be adjusted, so as to open and close the by-pass. The section e, of the valve stem, threads into a hole h, which terminates at its outer end, in a chamber i suitable for the reception of a packing. The chamber i is formed in a neck j on the shell or casing 1 of the valve; and this chamber i has threaded thereinto a follower k, by means of which the packing can be compressed in the chamber so as to make a tight joint around the valve stem. The follower or gland k extends out from a flange rim l, having a wall m with an opening or chamber n, which wall encircles the outer end of the stem f and prevents the stem from being broken off or injured by blows or otherwise. The by-pass 40, in the construction of Fig. 2, can be opened for blowing out purposes by receiving the valve head c with its seating face b, so as to open the by-pass; and the by-pass is closed by again advancing the valve head with its seating face into seating position, as shown in Fig. 2. The operation of the outlet passage 25 and the float 27 is the same as described for the operation of these parts in the construction of trap valve shown in Fig. 1, and is, therefore, not specifically described. The oil and floatage, in the construction of trap valve of Fig. 2, will be first carried away as described for the removal of the oil and floatage in the construction of Fig. 1. The difference in the two constructions is in the formation of the inlet passage and the valve controlling the by-pass, and as to these parts, the operation is practically the same in the two constructions. The seating face for the guide stem in the plug 12 has a hole or countersink 48ª to prevent jamming and breaking down the end of the hollow guide stem and closing the port of said stem.

What I claim as new and desire to secure by Letters Patent is:

1. In a steam, air and water trap valve, the combination of a casing inclosing a chamber, the casing having an inlet passage for water of condensation to enter the chamber, and having in its side and bottom wall a downwardly and inwardly extending conduit for water of condensation to escape from the chamber, the receiving end of the side conduit opening into the chamber with its lower side approximately in line with the central horizontal plane of the chamber and in a plane below the line of flotation of a float within the chamber, a float operative within the chamber of the casing, and a stem carried by the lower end of the float and controlling the discharge at the lower end of the conduit for the water of condensation from the chamber, substantially as described.

2. In a steam, air and water trap valve, the combination of a casing inclosing a chamber, the casing having an inlet passage for water of condensation to enter the chamber at the bottom, and having in its side and bottom wall a downwardly and inwardly extending conduit for water of condensation to escape from the chamber, and the receiving end of the conduit opening into the chamber with its lower side approximately in line with the central horizontal plane of the chamber and in a plane below the line of flotation of a float within the chamber, a float operative within the chamber of the casing, and a stem carried by the lower end of the float and controlling the discharge at the lower end of the conduit for the water of condensation from the chamber, substantially as described.

3. In a steam, air and water trap valve, the combination of a casing inclosing a float chamber, the casing having in its lower end a discharge chamber with an outlet therefrom for discharging water of condensation, an inlet passage for water of condensation to enter the float chamber at the bottom on one side, and also having in its side and bottom wall a downwardly and inwardly extending conduit for water of condensation to escape from the float chamber, the discharge end of the inlet passage opening direct into the lower end of the float chamber and the receiving end of the side conduit opening into the float chamber with its lower side approximately in line with the central horizontal plane of the chamber and in a plane below the line of flotation of a float within the chamber, and at its discharge end communicating with the discharge chamber in the lower end of the casing, a float operative within the chamber of the casing, and a stem carried by the lower end of the float and controlling the flow from the side conduit into the discharge chamber for the water of condensation, substantially as described.

4. In a steam, air and water trap valve, the combination of a casing open at the top and having in its lower end a discharge chamber with an outlet therefrom for discharging water of condensation, a cap closing the open upper end of the casing, the cap and casing inclosing a float chamber, the casing at the bottom on one side having an inlet passage for water of condensation to enter the float chamber and having in its side and bottom wall a downwardly and inwardly extending conduit for water of condensation to escape from the float chamber, the conduit leading from the midway length of the chamber to the discharge chamber in the lower end of the casing, the discharge end of the inlet passage opening directly into the lower end of the float chamber and the receiving end of the side conduit opening into the float chamber with its under side approximately in line with the central horizontal plane of the chamber and in a plane below the line of flotation of a float within the chamber, a float operative within the chamber of the casing, the receiving end of the side conduit allowing oil and floatage to pass from the float chamber into the conduit below the line of flotation of the float in the chamber, and a stem carried by the lower end of the float and controlling communication between the discharge chamber in the lower end of the casing and the side conduit in discharging water of condensation from the float chamber, substantially as described.

5. In a steam, air and water trap valve, the combination of a casing having an open top and having in its lower end a cross passage with a port downwardly leading therefrom for discharging water of condensation, a cap closing the open end of the casing and with the casing inclosing a chamber, the casing at the bottom on one side having an inlet passage for water of condensation to enter the chamber and having in its side and bottom wall a downwardly and inwardly extending conduit for water of condensation to escape from the chamber, the conduit leading from the midway length of the chamber to the cross passage and port, the discharge end of the inlet passage for water of condensation opening directly into the lower end of the chamber and the receiving end of the side conduit opening into the chamber with its under side approximately in line with the central horizontal plane of the chamber and in a plane below the line of flotation of a float in the chamber, a float operative within the chamber of the casing, the inlet end of the conduit allowing oil and floatage to pass from the chamber into the conduit below the line of flotation of the float in the chamber, and a stem carried by the lower end of the float and controlling communication between the bottom outlet passage of the casing and the side conduit for venting air and discharging water of condensation from the float chamber, substantially as described.

6. In a steam, air and water trap valve, the combination of a casing inclosing a chamber, the casing having an inlet passage for water of condensation to enter the chamber and having in its side and bottom wall a downwardly and inwardly extending conduit for water of condensation to escape from the chamber, the side conduit opening into the chamber with the lower side of its receiving end in a plane below the flotation point of a float in the chamber, for discharging the upper surface of a medium in the chamber below the line of flotation of the float in the chamber, a float operative within the chamber of the casing, and a stem carried by the lower end of the float and controlling the discharge end of the side conduit for the water of condensation from the chamber, substantially as described.

7. In a steam, air and water trap valve, the combination of a casing inclosing a chamber, the casing having an inlet passage for water of condensation to enter the chamber and having in its side and bottom wall a downwardly and inwardly extending conduit for water of condensation to escape from the chamber, the discharge end of the inlet passage for the water of condensation opening direct into the lower end of the chamber, and the receiving end of the side conduit for the water of condensation opening into the chamber with its lower side below the floating point of a float in the chamber, for discharging the upper surface of a medium in the chamber into the side conduit below the line of flotation of the float in the chamber, a float operative within the chamber of the casing, and a stem carried by the lower end of the float and controlling the discharge end of the side conduit for the water of condensation from the chamber, substantially as described.

8. In a steam, air and water trap valve, the combination of a casing inclosing a float chamber, the casing having an inlet passage for water of condensation to enter the chamber and having in its lower end a discharge chamber and in its side and bottom wall a downwardly and inwardly extending conduit in communication with the discharge chamber for water of condensation to escape from the float chamber, the receiving end of the side conduit opening into the float chamber with its lower side in a plane below the line of flotation of a float in the chamber, for escaping oil and floatage from the upper surface of the water of condensation in the chamber, a float operative within the chamber, and means operated by the float for controlling communication between the discharge end of the side conduit and the discharge chamber, substantially as described.

9. In a steam air and water trap valve, the combination of a casing inclosing a float chamber, said casing having a neck laterally extending from the bottom on one side, and having also at the bottom a central neck downwardly extending with a discharge chamber therein for the water of condensation, the casing and laterally extending neck having a sealed inlet passage for water of condensation to enter the float chamber and the casing having in its side and bottom wall a downwardly and inwardly extending conduit for water of condensation to escape from the chamber and enter the discharge chamber of the downwardly extending neck, the upper end of the conduit opening into the chamber with its under side in a plane below the line of flotation for a float in the chamber, a float operative within the chamber, and means carried by the float and operative to control communication between the side conduit and the discharge chamber with the rise and fall of the water of condensation in the float chamber, substantially as described.

10. In a steam, air and water trap valve, the combination of a casing having a float chamber, said casing having a neck laterally extending from the bottom on one side and having also at the bottom a central downcasing above and in line with the discharge chamber therein for the water of condensation, the casing and laterally extending neck having an inlet passage for water of condensation to enter the chamber, and the casing having in the side and bottom wall a downwardly and inwardly extending conduit for water of condensation to escape from the chamber and enter the discharge chamber of the downwardly extending neck, a plug entered into the bottom wall of the casing above and in line with the discharge chamber in the downwardly extending neck, said plug having a passage furnishing communication between the side conduit and the discharge chamber of the neck, a float operative within the float chamber, and a controlling valve carried by the float and operative to open and close the communicating passage in the plug with the rise and fall of the water of condensation in the float chamber, substantially as described.

11. In a steam, air and water trap valve, the combination of a casing inclosing a float chamber, the casing having an inlet passage for water of condensation to enter the chamber and having in its side and bottom wall a downwardly and inwardly extending conduit for water of condensation to escape from the float chamber, a cap closing one end of the float chamber, a hollow float operative within the float chamber, a venting stem carried by the lower end of the float and in communication with the interior of the float, a plug entered into the closing cap and having a guide hole terminating in an end seating face with a countersink centrally of the end seating face, and a tubular guide and venting stem carried by the upper end of the float and having a longitudinal passage, opening at its lower end into the interior of the float, with a venting port at its upper end, the passage and port furnishing communication between the float chamber of the casing and the interior of the float, said guide and venting stem entering the guide hole of the plug and having at its upper end around the venting port a seating face coacting with the end seating face of the countersink in the guide hole of the plug, for closing the air vent from the float chamber of the casing and preventing upsetting of the seating end of the tubular guide and venting stem with the rise of the float in the float chamber, substantially as described.

12. In a steam, air and water trap valve, the combination of a casing inclosing a float chamber, the casing having an inlet passage for water of condensation to enter the chamber and having in its side and bottom wall a conduit with the under side of its inlet end in a plane below the line of flotation of a float in the chamber for water of condensation to escape from the chamber, the casing also having a chamber in its lower end for receiving and discharging water of condensation from the conduit, a float operative within the float chamber, a shut off stem carried by the lower end of the float, and a plug having a vertical passage receiving the shut off stem and an outlet passage for discharging the water of condensation from the side conduit, said plug entered into the bottom wall of the casing and having a rounded upper end for preventing accumulation of sediment and grit that would interfere with the free movement of the shut off stem in the passage of the plug in opening and closing the outlet passage for discharging the water of condensation, substantially as described.

13. In a steam, air and water trap valve, the combination of a casing inclosing a chamber, the casing having an inlet passage for water of condensation to enter the chamber and having in its side and bottom wall a conduit for water of condensation to escape from the chamber, a plug entered into the bottom wall of the casing and having a vertical passage and a cross-passage with a port in communication with the side conduit for discharging water of condensation from the conduit, a float operative within the chamber and a stem on the lower end of the float entered into the vertical passage of the plug and controlling communication between the cross-passage and port and the terminal end of the conduit, said conduit at its inlet end opening into the chamber in a plane below the line of flotation of a float in the chamber for draining off the upper surface of the medium in the chamber, before the water of condensation entering the chamber has risen to the line of flotation for the float to fully open the bottom outlet passage and discharge the water of condensation, substantially as described.

14. In a steam, air and water trap valve, the combination of a casing inclosing a float chamber, the casing having an inlet passage for water of condensation to enter the chamber at the bottom, said inlet passage adapted to be sealed by the inflow of the water of condensation into the chamber, said casing also having in its side and bottom wall a conduit for water of condensation to escape from the float chamber, and having also in its bottom wall an outlet passage in communication with the side conduit for discharging water of condensation from the side conduit, said side conduit having its inlet end at the under side located and arranged in a plane below the line of flotation of a float in the chamber for an initial surface discharge of the water of condensation from the float chamber, such discharge carrying with it the oil and floatage, and a float operative within the chamber and adapted to be raised by the rise of the water of condensation in the float chamber to the floating point of the float, as the surface discharge of the water of condensation is started, and by such rise open the bottom outlet passage for discharging the surface floatage and the water of condensation escaping into the side conduit, substantially as described.

15. In a steam, air and water trap valve, a casing inclosing a float chamber, the casing having in its side and bottom wall a downwardly and inwardly extending conduit, said conduit at its upper end opening into the chamber with the under side of its inlet below the line of flotation of a float in the chamber and furnishing a drainage for the upper surface of the medium in the chamber before the medium has risen to the line of full flotation for the float in the chamber and said conduit having its terminal lower end in communication with an outlet passage in the bottom of the casing, a float in the casing adapted to rise and fall with the rise and fall of the medium in the casing, and a stem on the lower end of the float controlling the outlet at the terminal lower end of the conduit, substantially as described.

16. In a steam, air and water trap valve, a casing inclosing a float chamber, the casing having in its lower end a discharge chamber and having in its side and bottom wall a downwardly and inwardly extending conduit, said conduit at its upper end opening into the chamber with the under side of its inlet below the line of flotation of a float in the chamber and furnishing a drainage for the upper surface of the medium in the chamber before the medium has risen to the line of full flotation for a float in the chamber and said conduit having its terminal lower end in communication with the discharge chamber in the lower end of the casing, a float in the float chamber of the casing adapted to rise and fall with the rise and fall of the medium in the casing, a stem on the lower end of the float controlling the outlet at the terminal lower end of the conduit, and means for venting air from the chamber of the casing as the medium entering the chamber rises therein, substantially as described.

17. In a steam, air and water trap valve, a casing inclosing a float chamber, the casing having in its side and bottom wall a downwardly and inwardly extending conduit for water of condensation to escape from the chamber, said conduit at its upper end opening into the chamber with the under side of its inlet in a plane below the line of flotation of a float in the chamber to furnish a drainage for the upper surface of the medium in the chamber, before the medium has risen to the line of full flotation for the float in the chamber, a plug entered into the bottom wall of the casing and extending into the chamber of the casing, the plug having a longitudinal passage and a cross passage with a port downwardly leading from the cross passage, the cross passage and port forming an outlet passage for water of condensation from the side conduit, a float in the casing adapted to rise and fall with the rise and fall of a medium entering the chamber, and a stem on the lower end of the float and entered into the longitudinal passage of the plug with its lower end adapted to seat against the face of the port for the outlet passage and control the discharge of water of condensation, substantially as described.

18. In a steam, air and water trap valve, a casing formed with a float chamber, an inlet passage, for air and water of condensation, communicating with the float chamber, and a discharge passage having its receiving end communicating with the float chamber at and extending above the level of overflow from the float chamber into the passage, with the level of overflow below the line of flotation of a float in the float chamber, in combination with a float operative in the float chamber, and a valve carried by the float for governing the discharge end of said discharge passage, the float adapted to open the discharge passage when the water of condensation within the float chamber rises above a predetermined level of initial overflow for water from the float chamber into the discharge passage, substantially as described.

19. In a steam, air and water trap valve, a casing formed with a float chamber, an inlet passage, for air and water of condensation, communicating with the float chamber, and a discharge passage having its receiving end communicating with the float chamber at and extending above the level of overflow from the float chamber into the passage, with the level of overflow below the line of flotation of a float in the float chamber, in combination with a float operative in the float chamber, and a valve carried by the float for governing the discharge end of said discharge passage, the float adapted to open the discharge passage when the water of condensation within the float chamber rises above a predetermined level of overflow for water from the float chamber into the discharge passage, said trap valve being provided with means for discharging air from the float chamber, substantially as described.

20. In a steam, air and water trap valve, a casing formed with a float chamber, an inlet passage, for air and water of condensation, communicating with the float chamber, and a discharge passage having its receiving end communicating with the float chamber at and extending above the level of overflow from the float chamber into the passage, with the level of overflow below the line of flotation of a float in the float chamber, the inlet passage being sealed by the accumulation of water of condensation therein and in the float chamber, in combination with a float operative in the float chamber, and a valve carried by the float for governing the discharge end of said discharge passage, the float adapted to open the discharge passage when the water of condensation within the float chamber rises above a predetermined level of overflow for water from the float chamber into the discharge passage, said trap valve being provided with means for discharging air from the float chamber, substantially as described.

21. In a steam, air and water trap valve, a casing formed with a float chamber, an inlet passage, for air and water of condensation, communicating with the float chamber, and a discharge passage having its receiving end communicating with the float chamber at and extending above the level of overflow from the float chamber into the passage, with the level of overflow below the line of flotation of a float in the float chamber, in combination with a float operative in the float chamber, and a valve carried by the float for governing the discharge end of said discharge passage, the float adapted to open the discharge passage when the water of condensation within the float chamber rises above a predetermined level of overflow for water from the float chamber into the discharge passage, said float being provided with an air vent discharging beyond the lower end of said discharge passage, substantially as described.

22. A steam, air and water trap valve, comprising a casing inclosing a float chamber, the casing having a liquid discharge passage leading from the side of the float chamber and downwardly extending and arranged to initially discharge liquid from the float chamber at the level of the upper surface of the liquid before the float rises and thereby skim floating matter from the surface of the liquid for discharge outside of and below the bottom of the float chamber, the casing also having a conduit providing communication between a radiator and said float chamber, adapted and arranged to be sealed by the accumulation of water of condensation in the conduit, a float operative in the float chamber, and a valve carried by the float for governing the liquid discharge passage, said trap valve also having air discharging means arranged to discharge air after it has passed the line of flotation of the float, substantially as described.

23. In a steam, air and water trap valve, the combination of a casing having a float chamber, an inlet passage discharging into the float chamber and adapted to provide communication between a radiator and said float chamber, and a liquid discharge conduit opening at its upper end into said float chamber and adapted to take liquid from the side of said float chamber intermediate the top of the float chamber and the line of overflow for the surface of the liquid into the conduit, whereby the upper surface of the liquid is skimmed as the liquid is discharged from the float chamber, a plug entered into the bottom wall of the casing and having a liquid discharge port therein communicating with the liquid discharge conduit, a float operative in the float chamber and a valve carried by the float for governing the said liquid discharge port, said trap valve having air discharging means for discharging air from the float chamber above the line of flotation of the float, substantially as described.

24. A steam, air and water trap valve, comprising a casing inclosing a float chamber and having an inlet passage communicating with the float chamber, said inlet passage adapted to be sealed by accumulation of water of condensation and having also a liquid discharge passage located outside of the float chamber, said passage leading from one side of the float chamber at a point intermediate of the upper end of a float and the overflow line for the liquid from the float chamber into the said liquid discharge passage, a float operative in the float chamber, and a valve carried by the float and controlling the liquid discharge passage, said trap valve having means arranged to discharge air from the float chamber above the line of flotation of the float, substantially as described.

25. A steam, air and water trap valve, comprising a casing inclosing a float chamber and having an inlet passage communicating with said float chamber and arranged and adapted to be sealed by accumulation of water of condensation, an air and liquid discharge port, and a liquid discharge passage, said liquid discharge passage opening at its upper end into the side of the float chamber at a point intermediate of the point of overflow for the liquid from the float chamber into the liquid discharge passage and the upper end of the float chamber, said liquid discharge passage extending downwardly with its lower portion in a plane beneath the float chamber and in communication with the air and liquid discharge port, a downwardly extending valve controlling the air and liquid discharge port, and a float in the float chamber for operating the valve, substantially as described.

26. A steam, air and water trap valve, comprising a casing inclosing a float chamber, said casing having an inlet conduit communicating with the float chamber and arranged and adapted to be sealed by accumulation of water of condensation, the casing also having a liquid discharge passage opening at its upper end into the side of the float chamber at a point intermediate of the line of initial overflow for the liquid into the discharge passage and the upper end of a float in the float chamber, the lower extremity of said liquid discharge passage extending horizontally beneath and below the plane of the bottom of the float chamber, a hollow seating plug entered into the bottom wall of the float chamber and having a port communicating with the horizontal portion of the liquid discharge passage, a valve engaging a seat in said seating plug to govern the flow of liquid from the side discharge passage, and a float in the float chamber for controlling the valve, the trap valve having air discharging means for discharging air from the float chamber above the line of flotation of the float in the chamber, substantially as described.

JOHN E. BOEGEN.

Witnesses:
 Oscar W. Bond,
 Walker Banning.